April 12, 1949.  W. H. BIXBY  2,466,874
VOLTAGE REGULATION
Filed Jan. 31, 1945
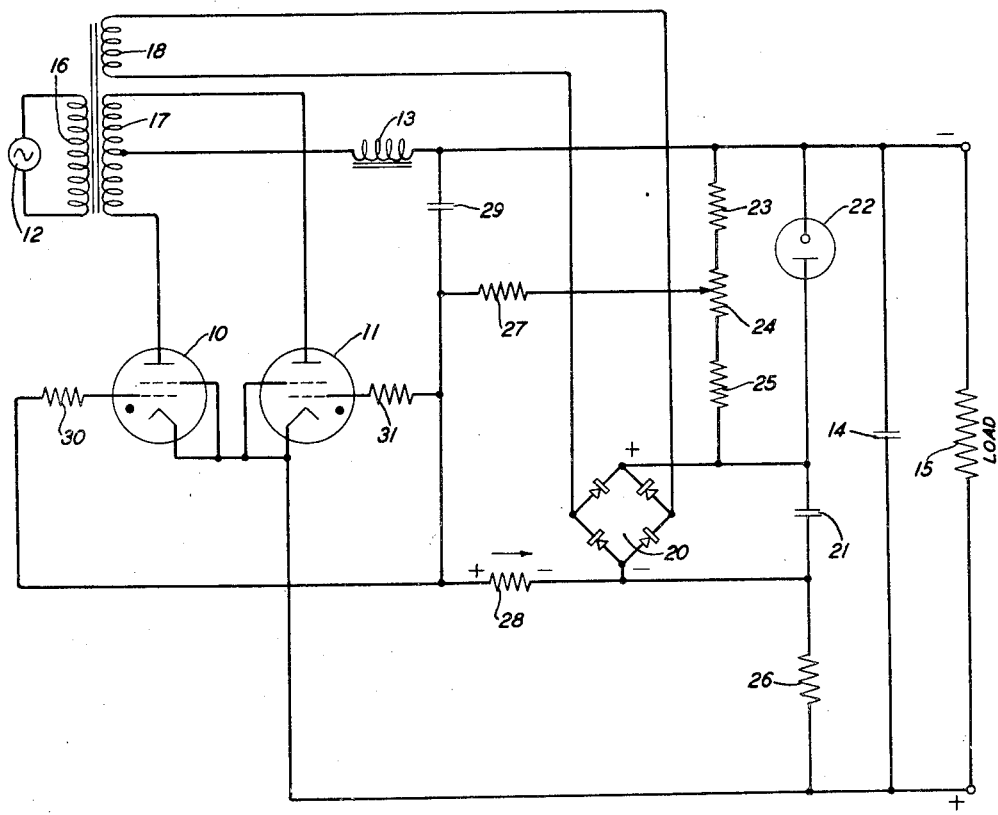
INVENTOR
W. H. BIXBY
BY
*G. F. Heuerman*
ATTORNEY Patented Apr. 12, 1949

2,466,874

UNITED STATES PATENT OFFICE 2,466,874

VOLTAGE REGULATION

William H. Bixby, Detroit, Mich., assignor to Donald R. Middleton and Stanley M. Hanley, doing business as Power Equipment Company, Detroit, Mich., a copartnership Application January 31, 1945, Serial No. 575,465

8 Claims. (Cl. 175—363)

This invention relates to voltage regulation and particularly to apparatus for regulating the supply of direct current to a load to maintain the load voltage substantially constant.

An object of the invention is to provide improved regulated rectifying apparatus for supplying direct current to a load.

In accordance with a preferred embodiment of the invention herein shown and described for the purpose of illustration, there is provided a main rectifier comprising a space discharge rectifying device having an anode, a cathode and a control electrode for rectifying current from an alternating current supply line and for supplying the rectified current to a load. There is set up in a circuit connecting the control electrode and cathode of the space discharge device a control voltage which varies in response to load or line voltage changes to greatly reduce or minimize load voltage changes. For setting up the control voltage there is connected across the load a current path comprising in series, in order, a first resistor, an auxiliary rectifier for producing an output voltage in aiding relationship in said path to the main rectifier voltage across said path and having variations corresponding to line voltage changes, and a voltage dividing resistance means including a variable potentiometer, there being connected across the voltage dividing resistance means a constant voltage device, such as a cold cathode discharge tube the resistance of which changes in response to current changes therethrough at such a rate that the voltage across the device remains substantially constant. One terminal of the first resistor is connected to the positive load terminal and the other terminal of said resistor is connected through a path comprising a second resistor to an adjustable contact of the potentiometer so that the current flowing through the second resistor, and therefore the voltage drop across it, is controlled in accordance with the setting of the adjustable contact of the potentiometer. A resultant voltage equal to the algebraic sum of the voltages across the first and second resistors is the control voltage which is impressed upon the control electrode-cathode circuit of the space discharge device of the main rectifier to control the current supplied to the load and therefore the load voltage.

The invention will now be described with reference to the accompanying drawing the single figure of which is a diagrammatic view of a regulated rectifier constructed in accordance with the invention.

Referring to the drawing, there is shown a main rectifier comprising space discharge devices 10 and 11, preferably of the gas-filled type such as RCA-2050, for rectifying current from a 110-volt, 60 cycle, alternating current supply source 12, and for supplying the rectified current through a ripple filter comprising series inductance element 13 and shunt condenser 14 to a load 15. There is provided a transformer having a primary winding 16, connected to the supply line going to source 12, and secondary windings 17 and 18. The end terminals of winding 17 are connected to the anodes of rectifier tubes 10 and 11, respectively, and a mid-terminal of winding 17 is connected through inductance element 13 to the negative load terminal. The cathodes of tubes 10 and 11 are connected to the positive load terminal.

There is provided an auxiliary bridge type rectifier 20 to which alternating current from the supply line is supplied through secondary transformer winding 18, a 2-microfarad filtering condenser 21 being connected across the output terminals of the auxiliary rectifier. The output voltage of the auxiliary rectifier 20 may be about 80 volts, for example, this voltage having variations corresponding to changes of supply line voltage. There is also provided a voltage regulating, cold cathode tube 22 such as RCA tube VR-150-30 which has the characteristic that its resistance changes in response to current changes therethrough at such a rate that the voltage across it is maintained substantially constant at 150 volts. Connected across the tube 22 is a voltage dividing resistance path comprising in series, in order, resistor 23, variable potentiometer 24 and resistor 25. A current path connected across the load 15 may be traced from the positive load terminal through a 3000-ohm resistor 26 to the negative output terminal of auxiliary rectifier 20 and from the positive output terminal of the auxiliary rectifier through the voltage regulating tube 22, to the negative load terminal. It will be seen that the total voltage acting to cause current to flow in this shunt path across the load 15 is the sum of the load voltage and the output voltage of the auxiliary rectifier 20. If the load voltage is 115 volts, the auxiliary rectifier output voltage is 80 volts, and if the voltage drop across the tube 22 is 150 volts, the voltage drop across resistor 26 will be 45 volts. Since the voltage across tube 22 is substantially constant, voltage changes across the load 15 and changes of the output voltage of auxiliary rectifier 20 corresponding to changes of line voltage will appear across resistor 26.

The adjustable contact of potentiometer 24 is connected through 100,000-ohm resistor 27 and 400,000-ohm resistor 28 to the negative output terminal of auxiliary rectifier 20, the common terminal of resistors 27 and 28 being connected through 0.25-microfarad condenser 29 to the negative load terminal. This common terminal of resistors 27 and 28 is also connected through 100,000-ohm resistor 30 to the control grid of tube 10 and through 100,000-ohm resistor 31 to the control grid of tube 11. Current flows in the circuit which may be traced from the positive output terminal of auxiliary rectifier 20 through resistor 25, an adjustable portion of potentiometer 24, resistor 27 and resistor 28 to the negative terminal of auxiliary rectifier 20 to produce a voltage drop across resistor 28 the magnitude of which may be varied by changing the setting of the adjustable contact of potentiometer 24 and thereby changing the voltage drop across the portion of the circuit comprising resistor 25 and a portion of potentiometer 24. The control electrode-cathode circuit of tube 10 comprises resistors 26, 28 and 30 in series and that of tube 11 comprises resistors 26, 28 and 31 in series, the voltage drop across resistor 28 being opposed to that across resistor 26 in these control electrode-cathode circuits.

If the line voltage rises, for example, the output voltage of auxiliary rectifier 20 increases substantially in proportion to the increase in line voltage. Since the voltage across tube 22 is substantially constant, the voltage drop across resistor 26 rises by an amount substantially equal to the increase of output voltage of auxiliary rectifier 20. The voltage drop across resistor 28 also rises due to the increase of auxiliary rectifier output voltage but this increase is smaller than the voltage increase across resistor 26. The latter therefore predominates so that the control electrodes of tubes 10 and 11 are made relatively more negative with respect to the cathodes with the result that the load current is reduced. Changes of load voltage due to line voltage changes are thus minimized or substantially prevented. Over-compensation can also readily be obtained if desired, so as to cause the load voltage to decrease with increasing line voltage, by proper choice of the relative valves of resistors 27 and 28, that is, by decreasing the resistance of resistor 28 or by increasing the resistance of resistor 27, or both. Similarly, an increase of load voltage, due to a decrease of load, for example, will appear as an increase of voltage drop across resistor 26 to cause a reduction of the current supplied to the load, thereby minimizing the change of load voltage.

In a test made on the regulating circuit described, the line voltage was varied over a range from 100 to 120 volts, and the load current was varied over a range from 38 to 200 milliamperes. It was found that the load voltage varied from 114.2 to 115.0 volts. In this test the setting of potentiometer 24 was fixed.

The load voltage may be adjusted over a considerable range by changing the setting of the adjustable contact of potentiometer 24. Moving the contact of potentiometer 24 in a direction to increase the voltage across the portion of the circuit comprising resistor 25 and a portion of the resistance of potentiometer 24, will make the control grids of tubes 10 and 11 relatively more negative with respect to the cathodes to decrease the current supplied to the load and therefore to decrease the load voltage. Moving the adjustable contact of the potentiometer in the opposite direction will have the effect of increasing the load voltage. After the potentiometer has been set to give a desired load voltage, the circuit will function to maintain the load voltage substantially constant at the desired value as described above.

What is claimed is:

1. In combination, a circuit for supplying current from a supply source to a load comprising in series with the load with respect to the source the anode-cathode path of a space discharge device having an anode, a cathode and a control electrode, a resistive path connected in series with said anode-cathode path with respect to said source comprising a first portion the resistance of which changes in response to current changes therethrough and a second portion having a resistance-current characteristic which differs from that of said first portion, an impedance element, a circuit connecting the control electrode and cathode of said space discharge device comprising one of the portions of said resistive path and said impedance element in series, and means for impressing across said impedance element a voltage comprising an adjustable portion of the voltage drop across the other portion of said resistive path.

2. In combination, a circuit for supplying current from a supply source to a load comprising in series with the load with respect to the source the anode-cathode path of a space discharge device having an anode, a cathode and a control electrode, a current path connected in series with said anode-cathode path comprising in series with respect to the source a first and a second resistance means the rate of change of resistance of said first resistance means with respect to the current in said path being different from that of said second resistance means, a circuit connecting the control electrode and cathode of said space discharge device comprising one of said resistance means for setting up in said control electrode-cathode circuit a first component voltage and means for impressing upon said control electrode-cathode circuit a second component voltage in series with the first, said last-mentioned means comprising means for deriving from the other of said resistance means a voltage which may be varied for causing said second component voltage in said control electrode-cathode circuit to change with the result that the load voltage may be set at a desired value.

3. A combination in accordance with claim 2 in which the polarity of said first component voltage is opposed to that of said second component voltage in said control electrode-cathode circuit.

4. A combination in accordance with claim 2 in whch said one of said resistance means which is in said control electrode-cathode circuit has a substantially constant resistance and in which the other of said resistance means has a resistance which varies at such a rate with respect to the current flowing through it that the voltage drop thereacross remains substantially constant.

5. A combination in accordance with claim 2 in which said one of said resistance means which is in said control electrode-cathode circuit has a substantially constant resistance and in which the other of said resistance means has a resistance which varies at such a rate with respect to the current flowing through it that the voltage drop thereacross remains substantially constant and in which the polarity of said first component voltage is opposed to that of said second component voltage in said control electode-cathode circuit.

6. A regulated rectifier comprising a main rectifier for rectifying current from an alternating current supply line and for supplying the rectified current to a load, said main rectifier comprising a space discharge device having an anode, a cathode and a control electrode, an auxiliary rectifier to which current is supplied from said supply line for producing across its output a direct voltage which varies in accordance with supply line voltage changes, a current path connected across said load comprising in series a first resistor, the output of said auxiliary rectifier and resistance means the resistance of which changes in response to current changes therethrough at such a rate that the voltage drop thereacross remains substantially constant, a circuit connecting the control electrode and cathode of said electric discharge device comprising in series said first resistor and a second resistor, a voltage dividing resistance path the terminals of which are connected to the terminals respectively of said resistance means, said resistance path comprising a potentiometer having an adjustable contact, and a circuit comprising in series the output of said auxiliary rectifier, that portion of said resistance path which is included between one of its terminals and said adjustable contact of said potentiometer, and said second resistor, the voltage across said second resistor being variable in response to changes of the setting of said adjustable contact of said potentiometer for controlling said main rectifier to cause said load voltage to be adjusted to a desired normal operating value, the voltage across said first resistor varying in response to load voltage and line voltage changes for controlling said main rectifier and thereby controlling the voltage across said load.

7. A regulated rectifier in accordance with claim 6 in which the polarity of the voltage across said first resistor is opposed to that across said second resistor in said control electrode-cathode circuit.

8. In combination, a main rectifier comprising electronic means having an anode, a cathode and a control electrode for rectifying current from an alternating current supply line and for supplying rectified current to a load, an auxiliary rectifier for rectifying current from said line to produce an output voltage which varies in response to line voltage changes, a circuit connected across said load comprising in series a first resistor, said auxiliary rectifier and voltage dividing resistance means, the voltage of said main rectifier and said auxiliary rectifier output voltage being in aiding relationship, one terminal of said first resistor being connected to the positive load voltage terminal, a voltage stabilizing means connected across said voltage dividing resistance means, the resistance of said stabilizing means changing in response to current changes therethrough at a rate such that the voltage drop across said voltage stabilizing means and across said voltage dividing resistance means is maintained substantially constant, a second resistor, one terminal of said second resistor being connected to the other terminal of said first resistor, means for connecting the other terminal of said second resistor to a desired point of said voltage dividing resistance means, and means for connecting said other terminal of said second resistor to said control electrode, thereby causing the current supplied to said load from said main rectifier to be controlled for controlling the load voltage.

WILLIAM H. BIXBY.

REFERENCES CITED

The following references are of record in the file of this patent:

UNITED STATES PATENTS

| Number | Name | Date |
|---|---|---|
| Re. 21,749 | Vance | Mar. 11, 1941 |
| 2,195,121 | Moyer | Mar. 26, 1940 |
| 2,383,492 | Klemperer | Aug. 28, 1945 |